(No Model.)

B. CATLEY & M. GRAFF.
Mold for Compound Ingots.

No. 238,087. Patented Feb. 22, 1881.

Witnesses.
Wm. N. Mortimer.
H. C. Kiskadden.

Inventor.
Benj. Catley,
Matthew Graff,
per
F. A. Lehmann,
Atty.

UNITED STATES PATENT OFFICE.

BENJAMIN CATLEY AND MATTHEW GRAFF, OF PITTSBURG, PENNSYLVANIA.

MOLD FOR COMPOUND INGOTS.

SPECIFICATION forming part of Letters Patent No. 238,087, dated February 22, 1881.

Application filed January 8, 1881. (No model.)

*To all whom it may concern:*

Be it known that we, BENJAMIN CATLEY and MATTHEW GRAFF, citizens of the United States, residing at Pittsburg, in the county of Allegheny and State of Pennsylvania, have invented certain new and useful Improvements in Making Molds for Casting Soft-Steel-Back or Iron-Back Ingots; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to an improvement in the process of making iron-back or soft-steel-back cast-steel ingots; and it consists in first using molds made of two pieces, of which one, during the process, is to be removed and replaced by a third piece differing in form from the one that has been removed. By the exchange of pieces of different forms a compartment is added for the reception of the metal that is to be welded to that cast in the mold before the removal of the piece, as will be more fully described hereinafter.

The accompanying drawings represent the mold we use in our process.

Figure 1:
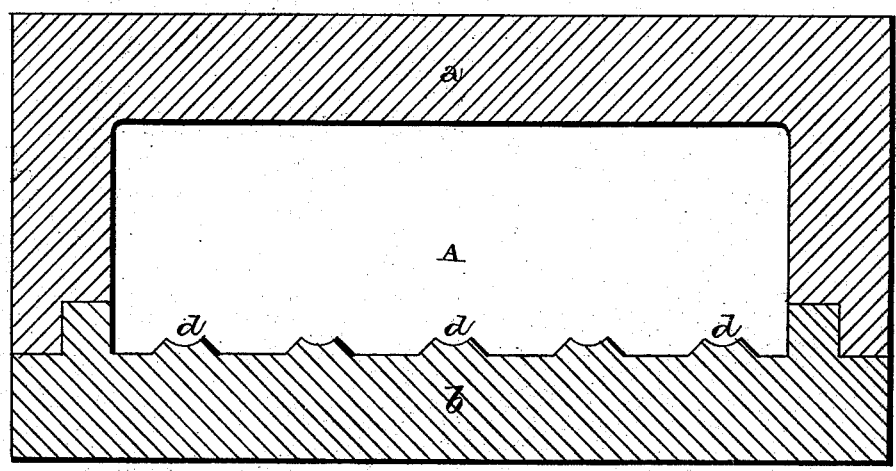
Figure 2:
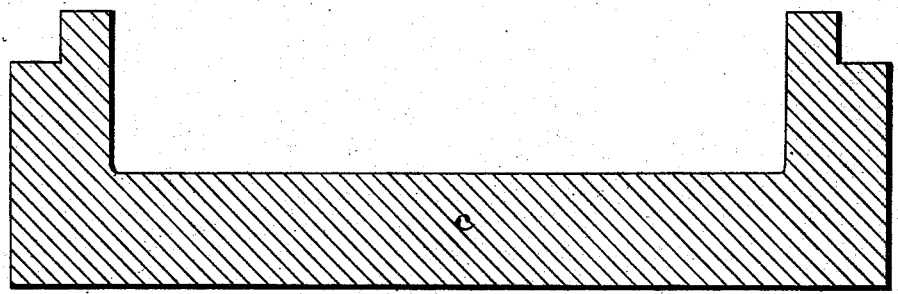

Figure 1 is a vertical section of the mold first used. Fig. 2 is a vertical cross-section of the portion of a mold that is added to the mold first used.

The mold A, into which the molten steel is poured, consists of two pieces, *a* and *b*, of which the piece *a* alone forms the two shorter and one long side of an oblong. The part *b* when applied fills the missing side of the oblong, and both pieces are provided with shoulders and recesses to form close joints. At the inner side of the piece *b* are beveled ribs *d*, with concave or flat tops, and projecting about five-eighths inch above the surface. The ribs are not indispensably necessary, although preferable, because a greater surface for welding is thereby obtained, and the metals, when brought in contact in the recesses between the ribs, are more firmly knit together. The piece *b*, being secured by bands or hoops to the piece *a*, completes the mold into which the melted steel is to be poured. This mold is of a capacity to hold about two-thirds of the total weight of the ingot when finished. As soon as the outside of the steel cast in the mold sets or becomes solid, while the center or heart is yet fluid, the piece *b* is rapidly removed and the piece *c* put in its place. The last-added piece, *c*, is also composed of three sides of an oblong, one of its longer sides being missing. This fourth or missing side of the oblong, when joined to the piece *a*, is supplied by the newly-cast steel, and a second mold is formed within the original for the reception of melted iron, soft steel, or both mixed. This part of the mold holds about one-third of the entire weight, more or less, of the finished ingot.

In order to weld or firmly join together iron, soft steel, or both mixed, with cast-steel, we first cast the steel into the mold formed by the pieces *a* and *b*, as described. As soon as the outward side of the melted steel sets or changes from a fluid to a solid state, while the center is yet fluid we remove the piece *b* and substitute the piece *c*, of which the two shorter sides are joined to the shorter sides of the piece *a*. The ribbed side of the cast-steel in the mold is now exposed and forms the fourth side of the new mold, and while it is red hot the fluid iron, soft steel, or a mixture of both, is poured into the empty space between the hot cast-steel and the longer side of the piece *c*.

It is not required that the molds should be oblong. Any other form, if found more convenient, may be substituted therefor, provided the process of welding as described is followed. Nor is it necessary to cast the steel first, for the iron or soft steel, when cast first, and the cast-steel afterward, will be welded as well as if it had been cast last.

We are aware that many attempts at welding together cast-steel and iron have been made, and knowing from experience the unreliability of all, it has been our object to discover a means that, if properly executed, secures invariably success. After many trials and experiments we find that the process herein described gives universal satisfaction, while all others known among iron and steel manufacturers have failed so to do.

We claim—

The combination of the two-part mold $a$ $b$, with the enlarged part $c$, which is adapted to be used in connection with the part $a$ when the part $b$ is removed, substantially as set forth.

In testimony whereof we affix our signature in presence of two witnesses.

BENJAMIN CATLEY.
MATTHEW GRAFF.

Witnesses:
GEORGE RIESECK,
T. F. LEHMANN.